(No Model.)
C. V. WOERD.
VELOCIPEDE.
No. 288,537. Patented Nov. 13, 1883.
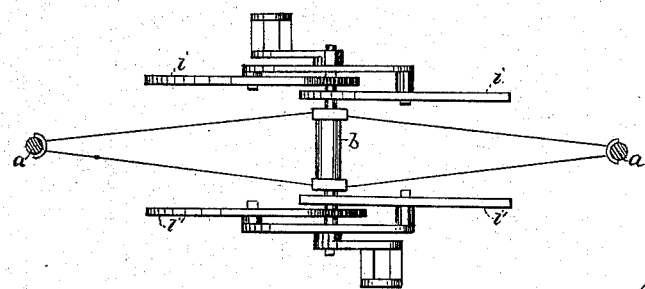
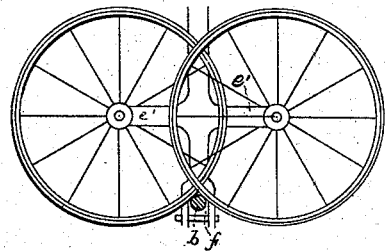
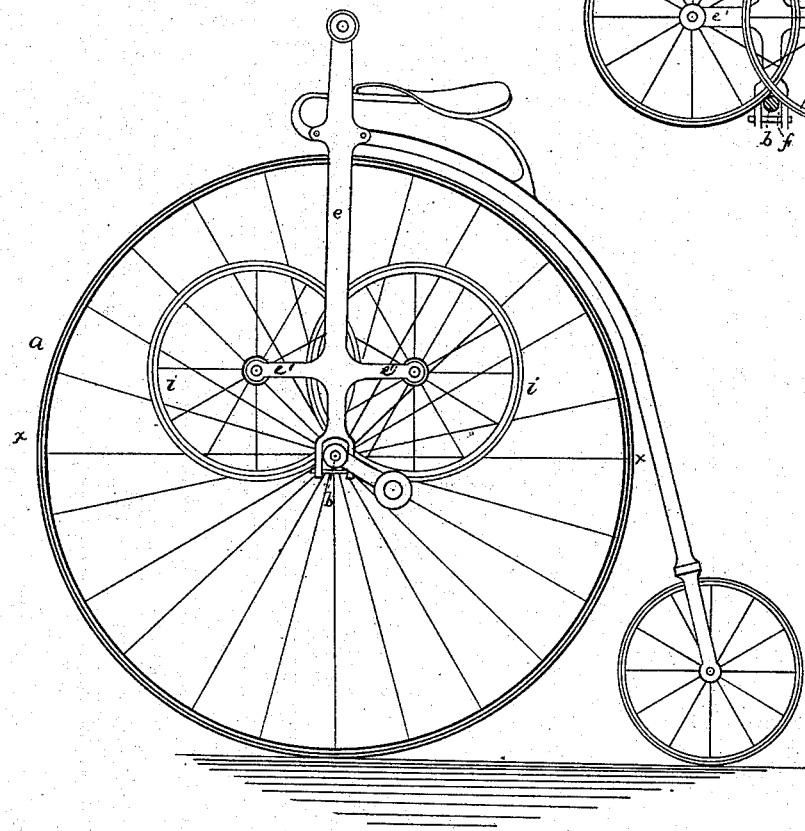

UNITED STATES PATENT OFFICE.

CHARLES V. WOERD, OF WALTHAM, MASSACHUSETTS.

VELOCIPEDE.

SPECIFICATION forming part of Letters Patent No. 288,537, dated November 13, 1883.

Application filed August 29, 1883. (No model.)

*To all whom it may concern:*

Be it known that I, CHARLES V. WOERD, of Waltham, in the county of Middlesex and State of Massachusetts, have invented certain Improvements in Velocipedes, of which the following is a specification.

This invention has for its object to relieve the friction involved by the bearing of the fork or forward portion of the frame of a bicycle or velocipede on the axle of the driving-wheel, and avoid the necessity of lubricating said axle.

It is well known that in most bicycles, as generally constructed, the fork or forward portion of the frame is provided with bearings, in which the axle or trunnions of the driving-wheel rotate. Said bearings are necessarily somewhat small, and as the greater portion of the weight of the rider and the frame is supported by the axle of the driving-wheel there is necessarily a considerable degree of friction at these bearings, and they have to be frequently lubricated.

My invention consists in constructing the fork so that it has no bearings on the axle, and in providing it with anti-friction wheels bearing on said axle, and supporting the forward portion of the frame and its load, as I will now proceed to describe and claim.

Of the accompanying drawings, forming a part of this specification, Figure 1 represents a side elevation of a bicycle provided with my improvement. Fig. 2 represents a section on line $x\ x$, Fig. 1, and a plan view of the parts below said line. Fig. 3 represents a section on line $y\ y$, Fig. 2.

In the drawings, $a$ represents the driving-wheel of a bicycle, and $b$ the axle thereof, rigidly attached to and rotating with the wheel. $e$ represents the "fork" or forward portion of the frame of the bicycle, which bestrides the wheel $a$, and has a pivotal connection with the "backbone" or rear portion of the frame. The fork, which heretofore has been provided with bearings in its lower ends resting on the ends of the axle, is provided with enlarged openings or slots $f$, through which the ends of the axle pass. Said slots $f$ do not constitute bearings, as they do not bear on the axle, in the ordinary sense, but merely constitute inclosures around said axle, which prevent the separation of the axle from the fork.

$i\ i\ i'\ i'$ represent two pairs of friction-wheels journaled in arms or offsets $e'\ e'$, formed on the branches of the fork, one pair being at one side of the driving-wheel and the other pair at the opposite side. Said wheels are arranged to bear simultaneously on the axle $b$, the weight of the forward portion of the frame and its load being supported by said wheels, and the latter being supported in turn by the axle of the driving-wheel. Each anti-friction wheel is preferably about one foot in diameter, and is preferably provided with an elastic rubber tire.

It will be seen that the anti-friction wheels, arranged as shown, constitute enlarged or extended rolling bearings for the axle, which enable the latter to rotate with much less friction than in bearings formed, as usual, in the fork or frame and surrounding the axle, even when the last-named bearings are provided with anti-friction balls.

It is obvious that a series of small balls interposed between an axle and its bearing, each having an independent center of rotation, will involve much more friction than my enlarged anti-friction wheels. The peripheries of the said wheels have the same rate of movement as the periphery of the axle, and therefore rotate at a much less rapid rate than said axle and the driving-wheel, so that there is comparatively little friction at the bearings of said anti-friction wheels, and little or no need of lubricating said bearings.

Although I have shown my improvement applied only to bicycles, it is obvious that it is equally applicable to tricycles and other forms of velocipede.

I am aware that it is not new to apply anti-friction wheels to the bearings of a velocipede. Such I do not broadly claim; but by making the fork of the machine with branching arms I am enabled to use large anti-friction wheels, and by passing the periphery of one of the wheels past the other the bearing of the main axle on the wheels is in such direction as to prevent the tendency to wedge between said wheels.

I claim—

1. The fork $e$, having arms $e'\ e'$, the wheels $i\ i$, journaled in said arms, with their peripheries extending past each other, and the axle $b$ resting on the peripheries of both wheels, as shown, and guided in slots $f$, all being combined in a velocipede, substantially as shown and described.

2. The combination, with the anti-friction wheels arranged as a bearing for the axle of a velocipede, as described, of elastic tires on the said anti-friction wheels, substantially as stated.

In testimony whereof I have signed my name to this specification, in the presence of two subscribing witnesses, this 22d day of June, 1883.

CHAS. V. WOERD.

Witnesses:
C. F. BROWN,
A. L. WHITE.